June 30, 1925.
J. H. IGO
1,544,233
JACKING ATTACHMENT FOR MOTOR VEHICLES
Filed Feb. 12, 1923
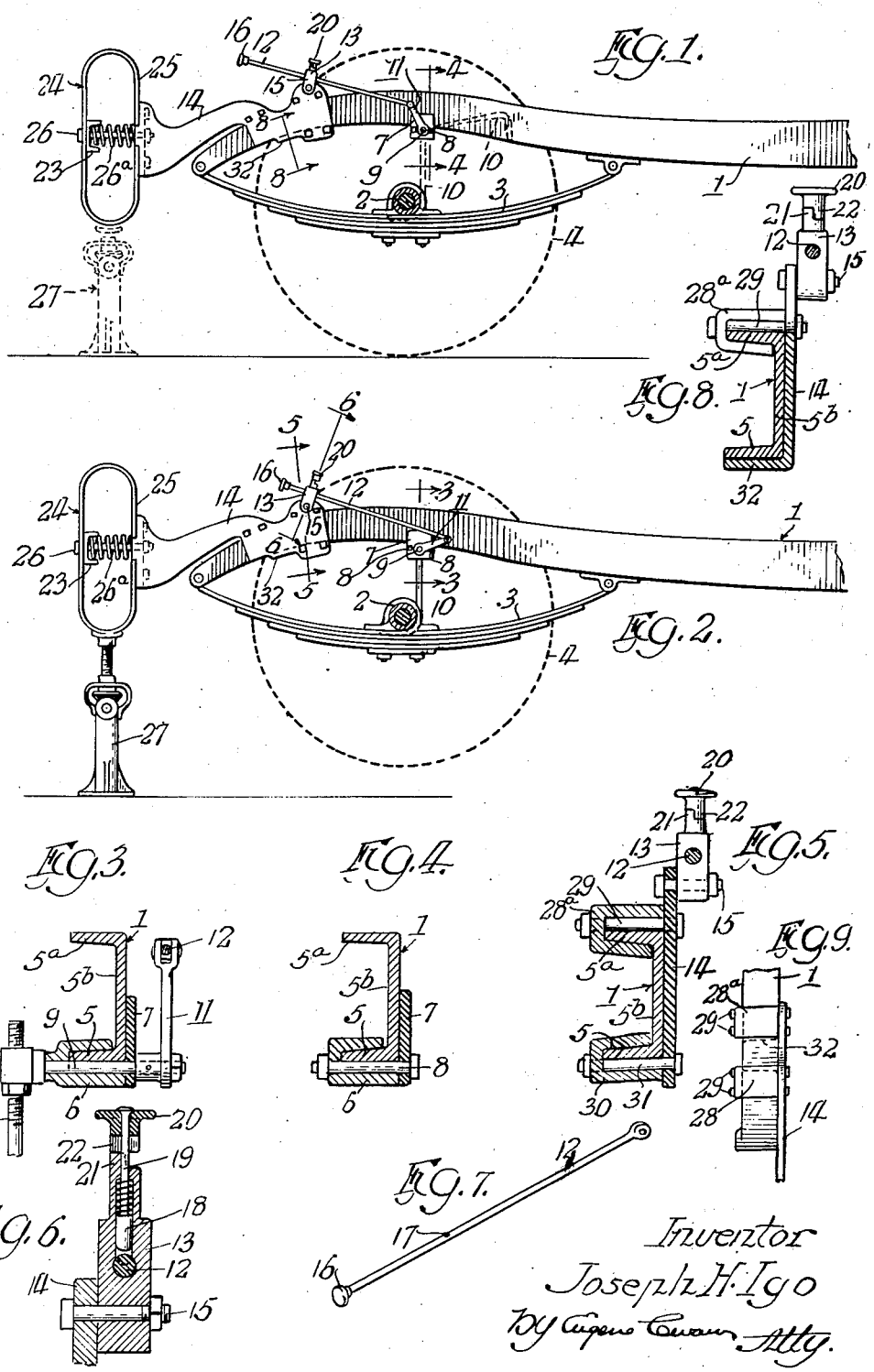
Inventor
Joseph H. Igo Patented June 30, 1925.

1,544,233

UNITED STATES PATENT OFFICE.

JOSEPH H. IGO, OF CHICAGO HEIGHTS, ILLINOIS.

JACKING ATTACHMENT FOR MOTOR VEHICLES.

Application filed February 12, 1923. Serial No. 618,491.

*To all whom it may concern:*

Be it known that I, JOSEPH H. IGO, a citizen of the United States, residing at Chicago Heights, in the county of Cook and State of Illinois, have invented new and useful Improvements in Jacking Attachments for Motor Vehicles, of which the following is a specification.

This invention relates to jacking attachments for motor vehicles of the kind described and claimed in my prior Patent No. 1,375,515, granted April 19, 1921.

The object of the present invention is to provide means whereby the coupling member of the device may be carried by the frame of the car above the axle and be swung into and out of engagement with the axle through a slidably mounted rod accessible from the exterior of the car body and thus be readily actuated when desired to connect the axle and frame together for jacking the wheel off the ground by the jack placed under the vertical guard of the bumper.

The invention consists further in the matters hereinafter described and more particularly set forth in the appended claims.

In the accompanying drawings—

Fig. 1 shows the coupling member carried by the frame of a vehicle at the rear axle and the rod for swinging the same into and out of operative engagement with said axle, in accordance with my invention;

Fig. 2 is a view of the same parts with the coupling member swung under the axle and wheel lifted from the roadway by a jack placed under the vertical guard of the bumper;

Fig. 3 is an enlarged vertical sectional view taken on line 3—3 of Fig. 2;

Fig. 4 is an enlarged vertical sectional view taken on line 4—4 of Fig. 1;

Figs. 5 and 6 are detail sectional views taken on lines 5—5 and 6—6, respectively, of Fig. 2;

Fig. 7 is a perspective view of the operating rod;

Fig. 8 is a vertical sectional view taken on line 8—8 of Fig. 1, to show a detail of construction; and Fig. 9 is a top plan view of the bracket and its attaching means.

In the drawings, 1 indicates a side member of the main frame or chassis of an automobile, 2 the rear axle below the same, and 3 the spring connecting the rear axle with the frame 1, as usual in structures of this kind. The axle is provided at each end with a wheel 4, and the latter of course is outside the frame.

The frame member 1, as shown in Figs. 3 to 5, is channel shape with the channel opening inward. Applied over the lower web 5 of the member 1 at a point above the axle 2 is a metal block 6. This, as shown in said figures, is substantially U-shape in cross-section to engage over said web 5 from the inside. The block 6 is held in place by a separable plate 7 clamped against the outside of the frame member 1 by a number of bolts 8, as shown.

The block 6 carries a horizontally arranged short rock shaft 9. Said shaft extends inward from the block inside of the frame member 1, and is there connected with a coupling member 10. Said member 10 has a length to extend between the frame 1 and axle 2 and has its lower end hook shaped to extend under the axle 2 in order to connect the latter with the frame 1 in the same manner as described in my prior patent aforesaid. The shaft 9 extends outside of the frame 1 through the clamp plate 7 and has there connected to it an arm 11. This arm extends upward from the shaft 9 and has pivotal connection with a rod 12.

Said rod 12 extends rearward from the axle 2 through an opening in a block 13 secured to a bracket 14 by a pivot pin 15. The free end of the rod 12 is enlarged or headed, as at 16, to facilitate grasping, and is provided between its ends with a shallow notch or recess 17 to cooperate with a spring pressed plunger 18 slidably mounted in the block 13 above the rod. When the plunger 18 engages the notch 17, the rod 12 is held in the position shown in Fig. 1 with the coupling member 10 raised up inside of the frame 1 and completely out of engagement with the axle 2. This is the position of the parts when not in use.

To release the rod 12 and permit the member 10 to swing by gravity under the axle 2 and couple the latter with the frame 1, I provide the plunger 18 with a vertical stem 19 extending above the upper end of the block 13 and there provided with a grasping portion or cap 20. The upper end of the block 13 is partly cut away to provide an upstanding lug 21, and the cap 20 has its lower end cut away in a complementary manner to provide a depending lug 22, which fits against the lug 21 to hold the plunger against rotation when engaged with the rod 12. To release the plunger from the rod and permit the latter to be moved, the cap 20 is raised and turned to carry its lug 22 across the one 21, as shown in Fig. 6.

In the particular installation shown in the drawings, the block 13 is pivotally carried by the bracket 14. This is clamped in a manner to be hereinafter described to the side frame 1 and extends beyond the rear end of the same, as shown in Figs. 1 and 2. The bumper across the rear end of the car comprises a horizontally arranged bumper bar 23, which has a length to extend from one side of the car to the other, as usual in bumper equipment. Extending across this bar adjacent each end is a vertical guard member 24. This follows the general arrangement shown in my said prior patent and has vertical front and rear sections connected top and bottom by loops, as shown. The rear section 25 is secured to the bracket 14 and a spring 26ª is between the sections and bears against the inside of the bar 23 to hold the latter against the inside of the front section, there being a bolt 26 extending between the parts and through the spring 26ª.

The guard 24 has a length to extend downward a sufficient distance to have a lifting jack 27 reach it, as shown in dotted lines in Fig. 1 and full lines in Fig. 2. The jack is used to lift the wheel 4 from the roadway, and before operating the jack for that purpose the plunger 18 is released from the rod 12 and the coupling member 10 allowed to drop by gravity under the axle 2 so as to connect the latter with the side frame 1 and thus permit the jack 27 to raise the wheel 4 off the ground when actuated. When not in use, the rod 12 is drawn outward, as shown in Fig. 1, to hold the member 10 raised, the plunger 18 holding the parts in that position.

By reason of the rod 12 of my invention, it is possible to carry the member 10 as a permanent part of the car equipment and readily reach it from a point exterior of the car body for swinging it into and out of engagement with the axle 2. This avoids the necessity of reaching under the car to apply the member 10 in place and swing it into and out of engagement with the axle as heretofore. Thus, the user of the car is not required to soil his hands or clothes in using the member 10, inasmuch as the rod 12 is easily accessible from a point exterior of the car body and the rest of the mechanism associated therewith. The vertical guard 24 of the bumper being also clear of the car mechanism may have the jack 27 placed beneath it outside of the car and be operated without being required to put the jack under the rear axle to lift the wheel off the roadway as heretofore. The mechanism described makes convenient and easy the use of the jacking attachment.

It is to be understood that substantially the same construction could be used at the front end of the car for the front axle, with only such changes in the attaching fixtures as may be required by the automobile construction at that end of the car. Moreover, whether at the front or rear end, two of said devices would be employed, one for each wheel.

The bracket 14 is attached to the frame member 1 in the following manner. The bracket extends alongside the frame 1 on the outside, as shown in Fig. 9. Over the top web 5ª of the frame member 1 are applied two substantially U-shaped blocks 28, 28ª. These are of course applied over said web from the inside and extend to the vertical web 5ᵇ of said frame member. One of these blocks 28 is shown in Fig. 5 and the other 28ª in Fig. 8. These blocks are clamped in place by bolts 29, 29, which extend inward through the blocks at their inner ends and outward through the bracket 14 at the outer ends. The bolts are between the blocks and the web 5ª and lie on top of the latter, as shown in Figs. 5 and 8.

Below the innermost top block 28ª is a similar block 30. This is applied over the bottom web 5 and is clamped in place by bolts 31, 31 in the same manner as the other blocks, as shown in Fig. 5. Forward of this block 30 is a lug 32. This is integral with the bracket 14 and extends under the lower web 5 and engages upward against the same. By reason of said lug, the upward lift on the bracket 14 by the jack 27 is transmitted to the frame member 1 and relieves the bolts 29 and 31 of excess strain.

While I have shown and described herein in detail a device of my invention, it is of course understood that the same may be variously changed and modified without departing from the spirit and scope of my invention.

I claim as my invention:

1. The combination with the spring connected frame and axle parts of a motor vehicle, of a pivoted coupling member carried by one of said parts for coupling the two parts together when lifting the axle part through the frame part, and means acting on said coupling member at or adjacent its pivot for moving said member into and out of coupling engagement with said parts, said means being carried by one of said parts and accessible from one side of the axle part.

2. The combination with the spring connected frame and axle of a motor vehicle with the axle below said frame, of a pivoted coupling member carried by said frame above said axle and having a hook shaped end to engage under said axle for connecting the frame and axle together when lifting the axle through said frame, and a slidable rod carried by said frame at one side of said axle and connected with said member for swinging the same into and out of coupling engagement with said axle.

3. The combination with the spring connected frame and axle of a motor vehicle with the axle below said frame, of a pivoted coupling member carried by said frame above said axle and having a hooked end to engage under the axle for connecting the frame and axle together when lifting the axle through said frame, a pivoted block carried by the frame at one side of said axle, a rod slidable in said block and connected with said coupling member for swinging the same into and out of coupling engagement with said axle, and a spring pressed member at said block and engaging a notch in said rod for holding said coupling member out of engagement with said axle.

4. The combination with the spring connected frame and axle of a motor vehicle with the axle below said frame, of a pivoted coupling member carried by said frame above said axle and having a hooked end to engage under said axle for connecting the same with said frame when lifting the axle through said frame, a pivoted block carried by said frame at one side of said axle, a rod slidable in said block and extending toward said member, an arm and rock shaft connecting the rod with said member, and a spring pressed member at said block and engaging a notch in said rod for holding said coupling member out of engagement with said axle.

5. The combination with the spring connected frame and axle of a motor vehicle with the axle below said frame, of a block clamped to said frame above said axle, a rock shaft in said block, a coupling member secured to one end of said shaft, a pivoted block carried by said frame member at one side of said axle, a rod slidable in said block and extending to said shaft, an arm secured at one end to said shaft and pivoted at its other end to said rod, and a spring pressed member carried by said pivoted block and engaging a notch in said rod for holding the coupling member out of engagement with said axle.

6. The combination with the spring connected frame and axle of a motor vehicle with the axle below said frame, of means for coupling the axle and frame together when lifting the axle through the frame, a vertically arranged member carried by said frame beyond the end of the same adjacent said axle and extending downward below the frame to a point enabling a lifting jack to be placed thereunder for lifting the axle through said frame, and means accessible at the frame between the axle and said vertical member for moving the coupling member into and out of engagement with said axle.

7. The combination with the spring connected frame and axle of a motor vehicle with the axle below said frame, of a pivoted coupling member carried by said frame above said axle and having a hooked end to engage under said axle, a bumper device carried by said frame beyond the end of the same at said axle, said bumper having a vertically arranged guard extending downward below the frame to a point enabling a lifting jack to be placed under and engage the same for lifting the axle with the frame through said coupling device, a slidable rod carried by said frame between said axle and said bumper and connected with said coupling member for swinging the same into and out of coupling engagement with said axle.

8. The combination with the frame and axle of a motor vehicle with the axle below said frame, of a pivoted coupling member carried by said frame, a bumper beyond said frame at said axle, a bracket connecting said bumper with said frame, said bumper having a vertical guard member extending downward a sufficient distance to enable a lifting jack to be placed under the same for lifting the axle with said frame through said coupling member, a block pivoted on said bracket between said bumper and said axle, a rod slidable in said block and connected with said coupling member for swinging the same into and out of coupling engagement with said axle, and means carried by said block and engaging said rod for holding the coupling member out of engagement with said axle.

9. The combination with the channel side member of an automobile frame, of a bumper bracket, comprising a body part applied against the outside of said channel member, blocks engaging over the top web of said channel member and clamped to said bracket, and a lug carried by said bracket and engaging the channel member under the lower web thereof.

10. The combination with the channel side member of an automobile frame, of a bumper bracket, comprising a body part applied against the outside of said channel member, blocks engaging over the top and bottom webs of said channel member and clamped to said bracket, and a lug carried by said bracket and engaging the channel member under the lower web thereof.

11. The combination with the frame and axle of a motor vehicle with the axle below said frame, of a pivoted coupling member carried by said frame, a bumper beyond said frame at said axle, and a bracket connecting said bumper with said frame, said bumper having a vertical guard member extending downward a sufficient distance to enable a lifting jack to be placed under the same for lifting the axle with said frame through said coupling member, said bracket having a lug engaging said frame beneath the same to impart the lift of the jack to said frame.

In testimony that I claim the foregoing as my invention, I affix my signature, this 27th day of November, A. D. 1922.

JOSEPH H. IGO.